United States Patent Office 3,183,443
Patented May 11, 1965

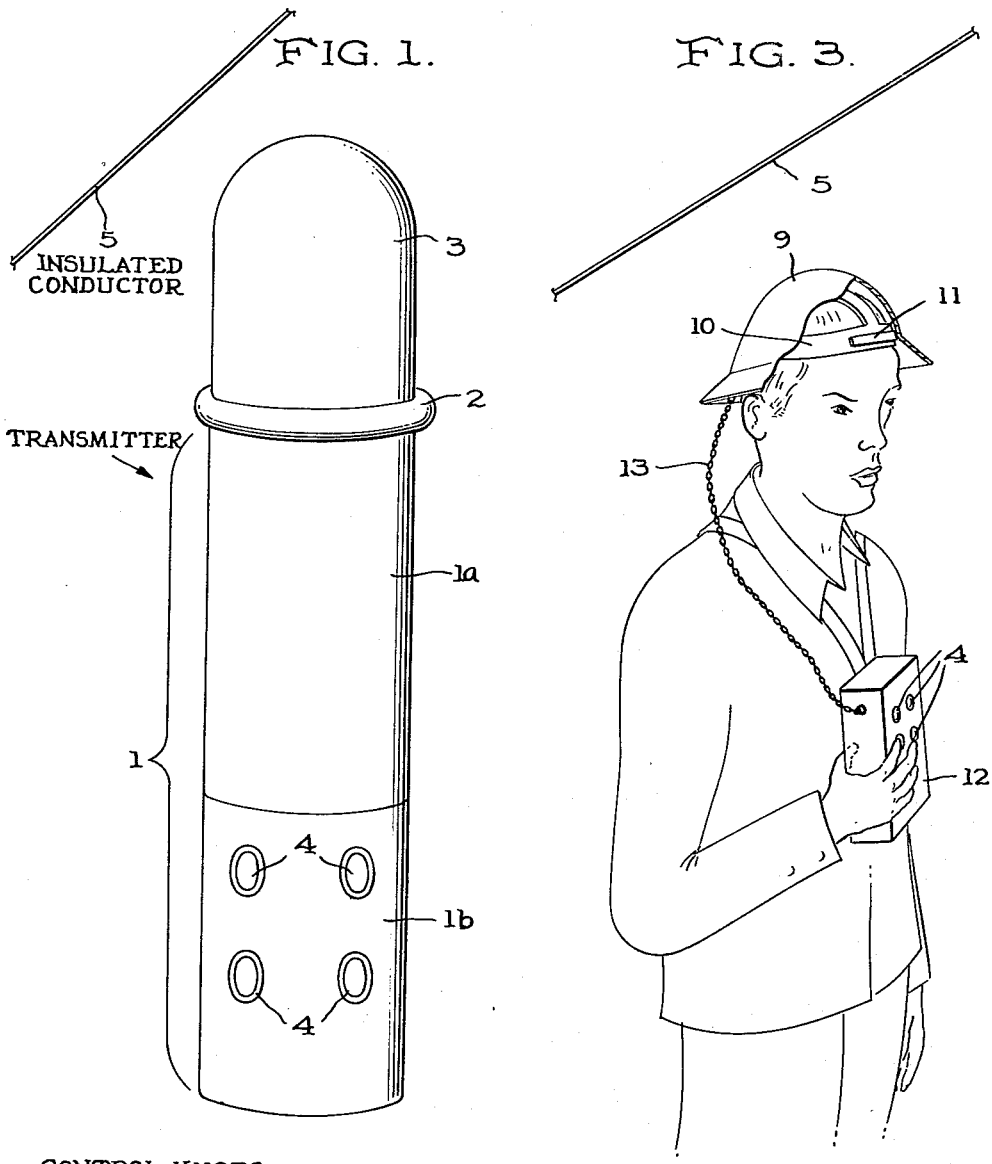
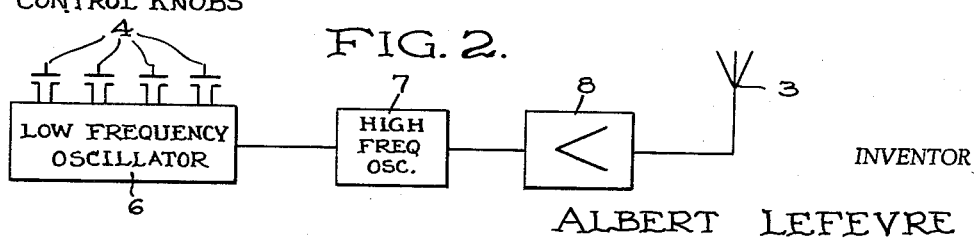

3,183,443
TRANSMISSION SYSTEM WITH ANTENNA MEANS FOR COUPLING TO AN INSULATED CONDUCTOR
Albert Lefévre, Verneuil-en-Halatte, France, assignor to Charbonnages de France, Paris, France, a public institution organized in France
Filed Sept. 11, 1962, Ser. No. 222,869
Claims priority, application France, Sept. 16, 1961, 873,398, patent 1,307,380; Jan. 8, 1962, 884,193
3 Claims. (Cl. 325—178)

It is known that in order to ensure the transmission of high-frequency signals in the interior of subterranean tunnels, it is advantageous to employ a capacitive coupling on an insulated conductor.

In French Patent No. 1,228,174 of March 4, 1959, by the present applicant, there has been described a portable device utilizing this characteristic, one of the original features of which is to ensure the earth return through the intermediary of the body of the operator. In this device the metallic coupler has a shape such that the operator must orientate it with respect to the insulated conductor in such manner as to produce a sufficient capacity effect.

The advantage of a coupler of this kind would thus be greatly increased if it could be just as effective irrespective of its orientation with respect to the said insulated conductor. For this reason, not only would the teachings of the above-mentioned French patent be more readily and more effectively applied because the operator would no longer have to concern himself with the orientation of the coupler, but the field of application of capacitive couplings on insulated conductors would be greatly extended (in particular in mines for example) so as to cover both radio-telephony apparatus (transmitter or receiver or transmitter-receiver) and the remote-control apparatus for motors, machines, control and signalling devices, etc., whether these apparatus were portable, fixed or semi-fixed.

The present invention relates to an improved coupler of the above kind and its applications.

The invention also covers the apparatus and devices which comprise the said coupler.

The coupler according to the invention has a shape such that, looking from the insulated conductor, it has a surface of substantially constant value, irrespective of its orientation, and produces a sufficiently large capacity effect with the insulated conductor. Thus:

According to a preferred construction, the coupler has a surface of revolution.

More particularly, the coupler has the shape of a dome.

According to other possible forms of construction, the coupler is cylindrical, conical or prismatic; it may also have the shape of a pyramid or of a frustum of a pyramid, of a prism, of a frustum of a cone, etc.

According to a further characteristic feature, the metal coupler is covered externally with an insulating coating.

In accordance with an alternative form, the coupler is constituted by an insulating material covered internally by a conductive lining.

According to an advantageous method of application, the coupler is constituted by a metal helmet containing an insulating headgear worn by the operator.

According to an alternative form, the coupler is constituted by a non-metallic helmet of which at least one face is metallized, the said helmet being worn through the intermediary of an insulating headgear as is known per se.

According to an alternative improvement, the metal or metallized helmet is provided with an insulating headgear of which one portion intended to be in contact with the body of the operator is metallized and put into contact with the earth terminal of the apparatus with which it is associated.

The metallization of the non-metallic helmet is produced by a known method, such as projection of vaporized metal, sticking of metallic sheets, or any other method permitting the production of an adherent metallic coating.

According to a characteristic feature, the coupler of the invention is associated with a transmitter or receiver device or a transmitter-receiver or a remote-control apparatus, and the invention then covers, by way of new industrial products, the apparatus comprising at least one casing containing the electrical and electronic circuits required in connection with the coupler of the invention and control knobs on the said casing for sending and/or receiving signals by high-frequency carrier current through capacitive coupling on an insulated conductor.

The advantages and other features of the invention will be brought out more clearly from the description which follows below, reference being made to the accompanying drawings, in which:

FIG. 1 shows by way of illustration an apparatus for transmission of remote-control signals by carrier current at high frequency.

FIG. 2 shows by way of non-limitative example the functional diagram of a remote-control transmitter utilizing the coupler according to the invention, applied to the apparatus of FIG. 1.

And FIG. 3 is a method of application of the coupler in the form of a helmet.

Referring to FIGS. 1 and 2, the appropriate electric and electronic circuits which will be referred to later are enclosed in a cylindrical casing 1 comprising a portion 1a containing the electronic circuits of the transmitter and a portion 1b comprising the control knobs such as 4.

The upper portion of the casing 1 comprises a ring 2 of insulating material, on which is fixed a coupler 3 according to the invention, in the form of a dome. The constituent material of this coupler is a non-magnetic conductive metal (brass, aluminum, etc.). It is in electrical connection with the output circuit of the transmitter as well known per se (or with the input circuit of the receiver if the apparatus is used for reception). In order to prevent accidental short-circuit by contact with the operator's hand, the metal dome is preferably covered with a plastic coating. According to an alternative form, the dome may be made of insulating material metallized on the inside, the metal coating thus obtained acting as the coupler.

Referring now to FIG. 2, the push-buttons 4, by putting into circuit capacities (not shown) each determine in the low-frequency oscillator 6 a voice modulation frequency of the high-frequency oscillator 7. The modulated wave is applied to the input of an amplifier 8, the output of which is connected to the coupler 3.

It is then possible, with an apparatus of the same kind as that which has just been described, to control a machine or a motor from a distance by acting on the push-buttons 4, through the intermediary of an insulated conductor 5, irrespective of the orientation of the coupler 3 with respect to the said conductor (since the coupler 3 presents to the conductor 5 a surface of substantially constant value). The said motor or the said machine will of course be equipped with a receiving apparatus also comprising a coupler according to the invention which is also coupled to the said insulated conductor.

Depending on the number of controls to be provided, the transmitter apparatus of the type which has just been described may comprise, as a function of the different frequencies concerned, one or a number of supplementary stages, each stage comprising a casing such as 1 with its own control buttons such as 4. Thus, with a single portable apparatus of this kind, the operator can control the working of machines, motors, signals or the like at any part whatever of the mine through the medium of an insulated conductor, without being concerned with his orientation with respect to the conductor.

The invention is of course aplicable to any system of reception or transmission of radiophony by capacitive coupling with an insulated conductor.

As has been previously indicated, the coupler of the invention may take the form of a helmet. This helmet which may be metallic or may comprise a metallized face if it is not itself metallic, will be put into electric coupling with, for example, the hot point of a transmission apparatus (portable casing). The earth terminal of the apparatus is in contact with the body of the operator, either by the metallic earth or a metal terminal in contact with the operator's hand, or by the metallized portion of the insulating headgear. A particularly convenient form of construction of such a headgear is to fit inside the headgear of a helmet a flexible and adhesive metal band located at the level of the forehead of the person wearing the helmet. In this way, the return to earth is effected between the earth terminal of the transmission apparatus by a connecting wire, the flexible metal band and the body of the operator.

FIG. 3 of the drawings shows a possible form of construction of the invention, in which a helmet 9 (corresponding to the coupler 3 of FIGS. 1 and 2) of stratified plastic material, shown broken away, is covered on its inner face with a layer of aluminium obtained by vaporization under vacuum. An insulating headband 10 is provided at the height of the forehead and on the inside with an adhesive metal tape 11. A tele-transmission apparatus 12 (corresponding to the casing 1 of FIG. 1) provided with control buttons 4 is connected to the helmet by a pair of wires 13. One of the two wires 13 is connected on the one hand to the hot point of the transmitter and on the other to the inside metal coating of the helmet 9. The other wire 13 is connected on the one hand to the earth terminal of the transmitter 12 and on the other to the adhesive metal strip 11 which, as shown in the drawing, is in direct contact with the operator's forehead.

It can thus be seen that the transmission apparatus is statically coupled between the metal face of the helmet 9 and the conductor 5, the earth return being effected through the operator's body through the intermediary of the forehead band 11. The conductor 5 may of course be a conductor already existing such as an electric conductor, instead of being a conductor specially arranged for that purpose.

For the illustration of the embodiment of the coupler of the invention in the form of a helmet, there has been taken as an example a casing of a portable transmitter, but it will be understood that this casing may, as has already been stated with reference to FIG. 1, serves also as a receiver, as a transmitter-receiver for radiophony or as a remote-control apparatus, and may comprise a plurality of rows of buttons 4.

The advantages of this embodiment reside as before in the fact that the operator need not concern himself with his position or with his orientation with respect to the coupling insulated conductor 5, especially if care has been taken to mount this conductor in an upper position.

It will furthermore be obvious that the present invention has only been described purely by way of explanation and not in any limitative sense, and that any useful modification may be made thereto without departing from its scope. Thus, in particular, the coupler of the invention and the apparatus which may be equipped with it can be applied in all rooms, workshops, worksites for coupling with a conducting wire wave-carrier.

I claim:

1. Coupling apparatus for the transmission or reception of high-frequency signals through capacitive coupling on an insulated conductor extending at least adjacent to the points of transmissions and reception comprising:

a coupler for capacitive coupling with said insulated conductor;

and transmitting or receiving apparatus operatively connected to said coupler;

said coupler including a helmet for wear by an operator transmitting or receiving the signals having an insulated headgear fitted inside said helmet, a metallized part of said helmet having a surface of substantially constant electrical value in any orientation in relation to said insulated conductor a metallized portion having contact with the earth terminal of the apparatus for transmission or reception of high-frequency signals and contact with the body of the operator wearing said helmet whereby the earth return is affected through the intermediary of the body of the operator, a casing worn by the operator, and control means on said casing for selecting signals for transmission through said coupler to the insulated conductor.

2. The coupling apparatus as claimed in claim 1, in which said surface is a surface of revolution.

3. The coupling apparatus as claimed in claim 1, in which said coupler includes an inner layer of conductive material, and an outer layer of insulating material.

References Cited by the Examiner

UNITED STATES PATENTS

| 1,219,682 | 3/17 | Vansize | 325—118 |
| 1,695,172 | 12/28 | Clement | 179—82 |
| 1,777,433 | 10/30 | Hale | 179—82 |
| 2,904,645 | 9/59 | Sarles | 325—361 |

FOREIGN PATENTS

| 397,959 | 9/33 | Great Britain. |
| 671,188 | 4/52 | Great Britain. |

DAVID G. REDINBAUGH, *Primary Examiner.*